Feb. 20, 1962 YASUSHI HOSHINO ET AL 3,022,079

TRANSFERABLE COATING MAGNETIC FILM FOR PRODUCING MAGNETIC RECORDING SHEETS

Filed June 11, 1958 2 Sheets-Sheet 1

United States Patent Office 3,022,079

Patented Feb. 20, 1962

3,022,079

TRANSFERABLE COATING MAGNETIC FILM FOR PRODUCING MAGNETIC RECORDING SHEETS

Yasushi Hoshino, 462 1-chome Tamagawa-Okusawacho, Tokyo, Japan; Mamoru Namikawa, 664 Kugahara-cho Ota-ku, Tokyo, Japan; and Shigezo Tochihara, Kawasaki-shi, Japan (531 Matsunoki-Jyutaku, Matsunoki-cho Suginami-ku, Tokyo, Japan)

Filed June 11, 1958, Ser. No. 741,423

Claims priority, application Japan June 17, 1957

1 Claim. (Cl. 274—41.4)

This invention relates to a transferable coating magnetic film for producing magnetic recording sheets to be used on a magnetic recording and reading apparatus, which comprises a carrier and a coating magnetic film adhered thereon, leaving on opposite sides margins demarcated by parallel straight lines in symmetrical positions, a layer of binding agent for transferring the said coating magnetic film to a sheet of other paper or analogous carrier, having reinforced small parts therein which are mechanically stronger than the remainder and simultaneously transferable together with the whole of the coating magnetic film in transferring.

The object of this invention is to provide a simple means at home thereby, for example, magnetic coating can be effected on the back side of a music sheet which can record the illustrated music on the front and thus, the real value of the magnetic recording and reading apparatus (described later) will be demonstrated highly.

This invention can eradicate an interruption or overlapping in recording and reproducing of sounds by maintaining punctually all over the film the operation wherein as soon as one of the plural reproducing or recording heads of the magnetic recording and reading apparatus goes off the said coating magnetic film, the following head comes in contact with the said film in succession.

This invention has reinforced parts formed on the said film which are also transferred to the magnetic recording sheet simultaneously with the said magnetic film. These reinforced parts protect the fitting parts of the said sheet from damage which may be caused in frequent uses of on and off the magnetic recording and reading apparatus and contribute to the improvement of durability of the said sheet.

Figures 1, 2, 3, 4, 5, 6, 7, 8, 9, 10, 11, 12:
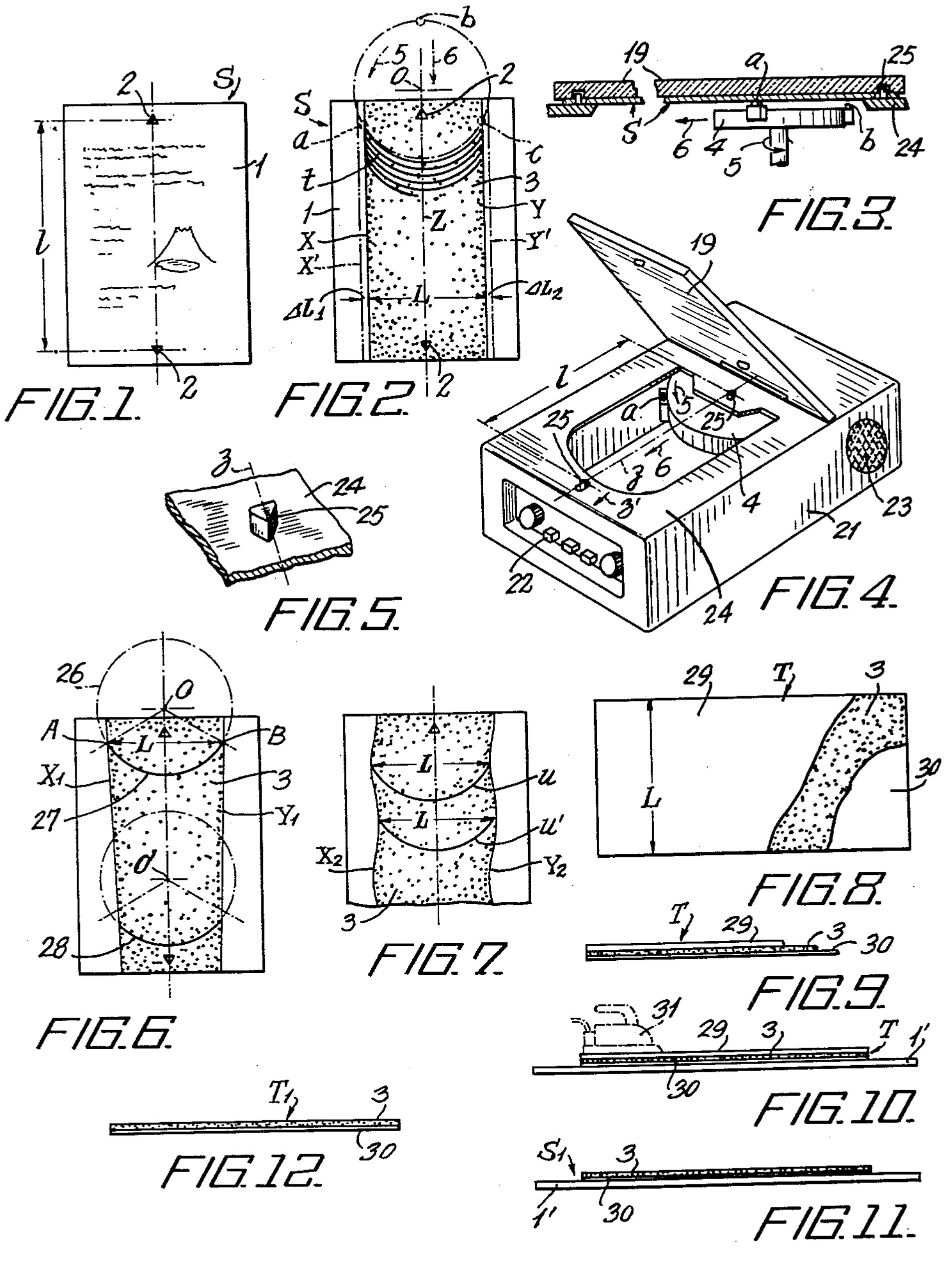
FIGURE 1 is a front view of a magnetic recording sheet to be used on the magnetic recording and reading apparatus.
FIGURE 2 is a back view of the same.
FIGURE 3 is a longitudinal section diagram illustrating the main part of the magnetic recording and reading apparatus fitted with the magnetic recording sheet shown in FIGURES 1 and 2.
FIGURE 4 is a perspective view of the magnetic recording and reading apparatus.
FIGURE 5 is a partial perspective view illustrating an example of a guiding pin for fitting the said sheet in the magnetic recording and reading apparatus.
FIGURES 6 and 7 are back views illustrating the examples of the sheet produced incomplete.
FIGURE 8 is a front view of the transferable coating magnetic film, layers partly scaled off.
FIGURE 9 is a part side-view of the same.
FIGURE 10 is a side-view of the transferring.
FIGURE 11 is a side-view of the transferred magnetic recording sheet.
FIGURE 12 is a side-view illustrating an example of the transferable coating magnetic film.

In FIGS. 1 and 2, S represents the front of the magnetic recording sheet to be used on the magnetic recording and reading apparatus, and 1 is a sheet of paper or analogous material, on the surface thereof letters and pictures are illustrated or can be illustrated. 2, 2 are fixing holes for fitting the said sheet in the magnetic recording and reading apparatus at certain positions to the convenience of recording or reproducing voices as stated later. Between the parallel lines of X and Y, a magnetic recording coating 3 is formed with a fixed width of L. This may be effected by painting magnetic recordable coating material which comprises powders of magnetic material such as $\gamma-Fe_2O_3$ or $Fe_3O_4$ which are dispersed in lacquer or by printing with such printing ink such as a paint containing the above-described magnetic powders in dispersion or by affixing with paste on paper 1 separate paper sized to the width L with such coating pre-prepared thereon.

The fitting holes 2, 2 are most advantageously positioned at the central line Z of the parallel lines, X and Y. When the sheet expands or shrinks depending upon either wet or dry, if the sheet is fitted in the recording apparatus fixed at the holes 2, 2 on the central line of the magnetic coating as stated later, in a case, for example, wherein the paper is expanded absorping wet, X slides to X′ and Y to Y′ with the resultant expansions of $\Delta L_1$ on the left side and $\Delta L_2$ on the right side. Being $\Delta L_1 = \Delta L_2$, the said expansion affects equally the left and the right in symmetry, and thereby causes less trouble in forming recording track on the magnetic coating 3 by such a method as stated later. If the fitting holes 2, 2 near either line of X or Y, inconvenience is caused by $\Delta L_1 \neq \Delta L_2$.

In consequence, it is advisable to produce the recording sheet so that its setting holes are positioned on the central line Z. The said holes are separated at the distance of which coincides, as described later, with the distance of the guiding pins provided on the recording apparatus wherein the sheet is fitted for the use.

In FIGS. 2, 3 and 4, the magnetic recording and reading apparatus for recording and reproducing sounds, which is fully disclosed in U.S. patent application 635,335, 1957 already filed, is now briefly summarized; 4 is a turntable (a member in support of recording heads) which progresses in the direction of the arrow mark 6 while revolving around the center axis O to the direction of the arrow mark 5. *a*, *b* and *c* are electromagnetic heads for the use of recording or reproducing in magnetic recording and laid on the circumference of the turntable at equal distances. The direct distances among them are identical with the width L of the coating 3 and the linear gap provided on each of the said heads is directed to the center O of the turn-table. The supporter of each head in FIG. 3 is lightly movable up and down but not horizontally. S in FIG. 3 is a magnetic recording sheet, whose magnetic coating faces downwards and is arranged to contact the recording heads. 19 is a pressing plate and placed on the sheet S in a position so as to push the sheet downwards from the above.

Suppose now the turn-table progresses in the direction of the arrow 6 while rotating to the direction of the arrow 5. If recording is effected by feeding each recording head with voice current, such a magnetic recording track as *t* in FIG. 2 is formed. Now, take back the head to the initial starting position and set the reproduction scanning on, then recorded voice will instantly become audible.

FIG. 4 illustrates an example of concrete form of such recording apparatus; 21 is a case body, 22 a handle of an electric circuit regulator, 23 a speaker, and 24 is a panel.

The guiding pins, 25, 25 are provided at the distance of *l* on the track Z on which the center of the axis of the turn-table 4 moves longitudinally. These guiding pins serve to set the sheet S on the panel 24 by fitting in the fitting holes 2, 2 of the sheet in FIGS. 1 and 2. It is the function of the fitting holes 2, 2 and the guiding pins 25, 25 that the sheet S is arranged always to come to a fixed position on the panel, regardless how many times the sheet is put on or off the recording apparatus. When the forms of the fitting holes 2, 2 of the sheet approximate the triangle as disclosed in FIGS. 1 and 2, those of the guiding pins 25, 25 are also made to approximate the triangles as in FIG. 5 and thus the two are arranged to fit in well.

In the said recording apparatus, if transparent material such as plastic or glass is used for the pressure plate 19, the relevant voices can be heard simultaneously while looking at to letters and pictures described on the surface of the sheet S in FIG. 1, and the magnetic recording and reading apparatus is thus completed. In case an intransparent plate, for example, a metal plate is used for the pressure plate 19, the present apparatus operates as a recording machine of voices and recording or reproducing of sounds can be effected on the sheet S.

Next, the reason why the magnetic recording coating 3 must be of the fixed width L, that is, why X and Y should be parallel lines is explained. Suppose that the magnetic recording coating 3 is formed between the two lines of such X, and Y, as in FIG. 6, which are not parallel, the center O of the turn-table is positioned as shown in the said figure and that the scanning track of the recording heads is 26, and also that the distance between A and B which are the crossing points of the said 26 and $Y_1$, $X_1$ is identical with L exactly, then recording track 27 thus formed is rational. But since the track 28 formed when the center of the turn-table is positioned at O' is clearly shorter than the regular arc A, B (the angle of A, O, B is 120° in case three heads are provided), recording is partially missing and devoid of completion. In the same light, as the recording track formed when the center of the turn-table is positioned upper than O is longer than the regular arc recording overlaps partially. In this way, the width L of the magnetic coating of the magnetic recording sheet must be exactly identical with the distance between the gaps of the heads and the two sides in symmetrical position of the said coating must be parallel. However, in a case as in FIG. 7 wherein both rims of the magnetic coating are parallel but slightly waving as seen in $X_2$ and $Y_2$ and the chords of arcuate tracks *u*, *u'* produced thereon are identical with L in length, recording can be effected but not quite complete as in a case wherein a magnetic coating is formed between parallel straight lines X and Y. When the waving of $X_2$, $Y_2$ is larger than a certain extent, marked hindrance is caused in recording and regenerating.

The magnetic recording sheet S as in FIGS. 1 and 2 is produced generally at the factory by forming, on a sheet of paper 1 in a position, a magnetic recording coating 3 with a fixed precise width L by means of painting or printing, leaving margins of paper both outside the magnetic coating. The said margins form non-magnetic parts.

The fitting holes 2, 2 are provided on the central line Z in a fixed distance 1. In operating the magnetic recording apparatus using such a recording agent as the said sheet, the operator sometimes desires to form a magnetic coating and record thereon by himself on any optional letter paper, printed matter or newspaper at hand. It takes not only time but also is uneconomical and inconvenient to send such optical matters to a factory and to have a magnetic coating formed at the factory by means of painting or printing.

Thereupon, it is very convenient in forming a magnetic recording coating easily and completely on any optional paper as related in the following, if a transferable coating magnetic film T as illustrated in FIGS. 8 and 9 is used, which comprises a carrier 29, for example, of a plastic film at the top, a magnetic coating 3 under 29 and a layer of binding agent 30 at the bottom.

In FIG. 10, when the said transferable coating magnetic film T put on a sheet of paper 1' is rubbed in pressing with a hot flatiron 31, T is bound on a sheet of paper, provided 30 is a binding agent of heat-plasticity such as vinyl acetate film. Then a carrier 29 is scraped off and a magnetic coating 3 is found being formed on a sheet of paper 1' as in FIG. 11. If the width of the transferable film in FIG. 8 is made identical with L, a magnetic coating $3_1$ is obtained having a fixed parallel width L along the whole length. It is also good of course as $T_1$ in FIG. 12 to provide a layer of a binding agent 30 under a coating magnetic film 3 and paste these on a sheet of paper 1, but FIG. 9 is preferable as the said magnetic film 3 is very thin and not easy to paste. This, then, may well be bored at desired positions 32, 32 for the fitting holes by the perforator in FIG. 13. 33' is the base of the perforator and the boring punches 34, 34, supported by the supporting arms 33, 33 are provided with cutting tip at their low edges and form a complete puncher in conjunction with the holes provided directly beneath the said cutting tip. (In the figure, the holes are not seen hidden by the sheet $S_1$.) Laying the sheet $S_1$ on the base 33' so that one rim Y of the magnetic coating 3 of the sheet S, coincides with the indicators 32', 32' provided on the base 33', if 34, 34 are pushed down by the buttons 35, 35, the desired fitting holes are formed in the positions 32, 32 in the distance of *l*, and thus, a magnetic recording sheet as illustrated in FIGS. 1 and 2 is obtained.

Figure 14:
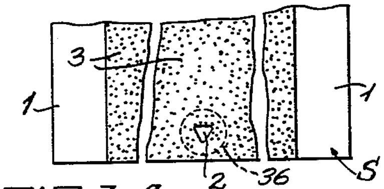
FIGURE 14 is a part plan view of the said sheet having a reinforced part at the part of the fixing hole.
Figure 15:
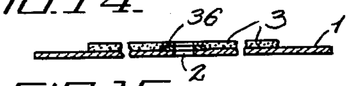
FIGURE 15 is a part cross-section view of the same.

However, the sheet produced in this way becomes vulnerable, while repeatedly set on and off the guiding pins of the recording apparatus with the fitting holes 2, 2, and these holes are often deformed due to the frailty of the sheet of paper 1 and the magnetic coating 3. (The width is generally about 1/100–3/100 mm.) Particularly in fitting the sheet in the recording apparatus as in FIG. 4, it is generally arranged that the guiding pin 25 on the right side is fixed but the left side one is movable to some extent in the direction of the arrow mark Z' by means of a spring so as to draw and expand the said sheet. So the fitting hole of the sheet is drawn to the direction of Z' and thereby tends to cause damage. Thereupon, as in FIGS. 14 and 15, a small reinforced part 36 is provided around the hole 2 of the sheet S, comprising a thin circular sheet of paper, metal or plastic larger than the hole 2. As the result, the recording sheet is substantially reinforced in practical use and will not be damaged how many times the sheet may be set on and off. The said reinforced part is an eyelet formed between the sheet of paper 1 and the magnetic coating 3 and is difficult to wear in feeling by fingers from outside the sheet, and looks nice being hidden from the back and front of the sheet. The eyelet may also be formed on the sheet of paper 1 or on the magnetic coating 3 without changing the essence of the present invention.

Figure 13:
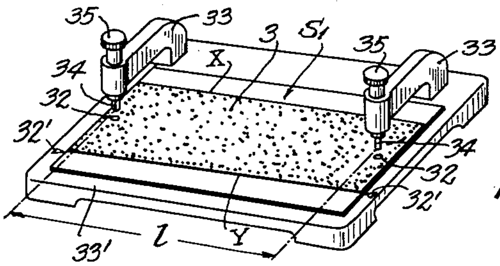
FIGURE 13 is a perspective view of a perforator for boring the fixing holes in the said sheet.

After having formed the sheet by the process above disclosed, using the perforator in FIG. 13, the eyelets may be formed at the front or the back of the said sheet. But in this method, it is troublesome to paste the eyelets and besides, very annoying and unpractical to paste, letting coincide precisely, the triangular holes made at the eyelets and the fitting triangular holes of the sheet. By this method, such a magnetic sheet of good appearance as in FIG. 15 cannot be produced, which comprises the eyelets provided between the sheet of paper 1 and the magnetic coating 3 with no fear of falling off in feeling by fingers although they project.

Figure 16:
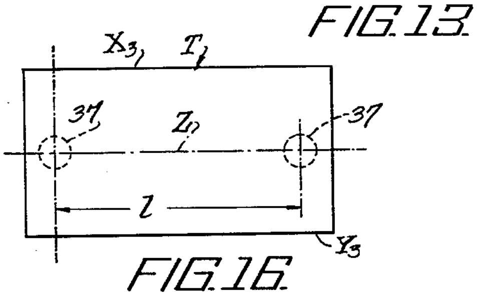
FIGURE 16 is a front view illustrating an example of the transferable coating magnetic film.
Figure 17:
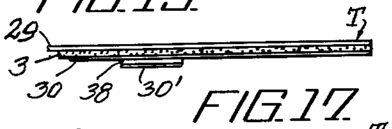
FIGURE 17 is a side-view of the same.

In FIG. 16, small reinforced eyelets are provided in the dotted circles 37, 37 with their centers on the central line Z of the coating magnetic film T as illustrated FIG. 8, which are reinforced with a thin film of metal, plastic or strong paper. Within the extent of these dotted circles the fitting holes are expected to be made by the perforator. FIG. 17 is a partial sectional view of the above wherein a magnetic coating 3 and a layer of binding agent 30 are provided under the carrier 29, and the agent 30 is reinforced partially by a small piece 38. On the surface of the part 38 a layer of binding agent 30' is formed.

When the said coating magnetic film is transferred on a sheet of paper 1 by the method illustrated in FIGS. 10 and 11, a magnetic recording sheet with the reinforcements without holes is produced with precision very easily and is very convenient for practical use. Further, in FIG. 18, a magnetic coating 3 is painted or printed on a thin sheet of paper 30 and a reinforcement 38 is adhered to the said sheet of paper 30. A magnetic recording sheet may be produced by sticking the said transferable coating film T, whose bottom face is applied all over with liquid paste (for example, of business use), on a sheet of paper. But in this method, the sheet tends to crease, and the expansion and contraction of the sheet is markedly noticeable before and after it's dry, and it may be not so good as shown in FIG. 17. A recording sheet may also be produced as illustrated in FIG. 19. A layer of binding agent 30 is provided beneath a magnetic coating 3 and underneath the said layer, a reinforcement 38 is added, which is provided at its bottom with a layer of binding agent 30'. 30 and 30' are composed of heat-plastic agent such as acetate vinyl. Laying the above on a sheet of paper (with the magnetic coating facing upwards), this magnetic film T is transferred on the paper by pressing with a flatiron from above the said magnetic film.

Figure 18:
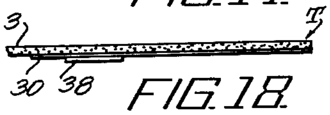
FIGURES 18–21 are cross-section views illustrating other examples.
Figure 19:
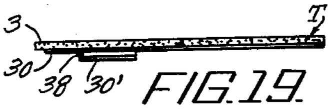
Figure 20:
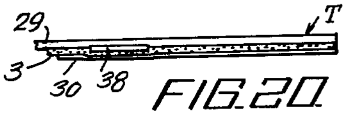

Although in examples in FIGS. 17, 18 and 19, the reinforcement 38 is added beneath the magnetic coating 3, it does not apparently change the idea of the present invention even if the reinforcement is formed above the magnetic coating. To explain in the concrete, as illustrated in FIG. 20, beneath a carrier 29 a magnetic coating is formed. Between the two members 29 and 3 a reinforcement 38 is provided in part, having a cohesive power weaker to the carrier and stronger to the coating. Beneath the said coating, a layer of binding agent 30 is formed.

Figure 21:
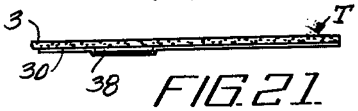

Further, a transferable magnetic film may also be formed without a carrier as illustrated in FIG. 21 by providing a reinforcement 38 underneath a magnetic coating 3 and forming a layer of binding agent beneath all over.

Figures 23, 24, 25:
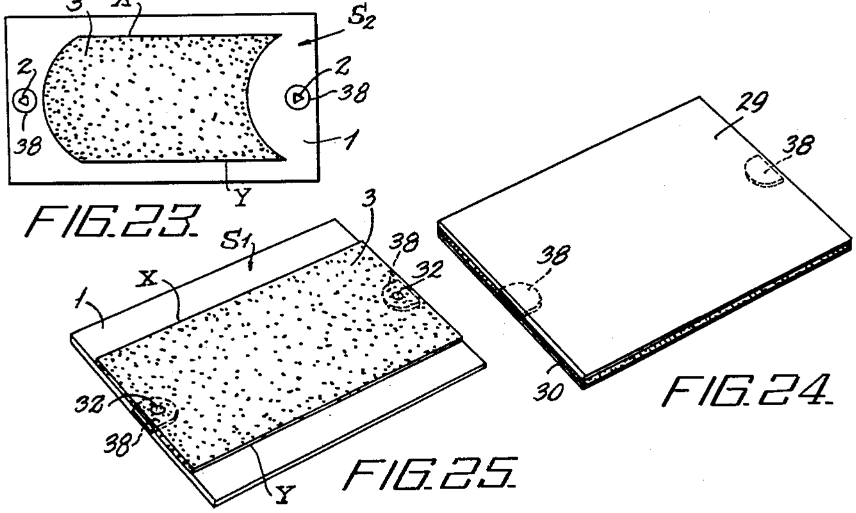
FIGURE 23 is a back view of the transferred sheet.
FIGURE 24 is a perspective view of the transferable film shown in FIG. 21.
FIGURE 25 is a perspective view of the produced sheet.

The whole of the transferable coating magnetic film as illustrated in FIGS. 17–21 is shown in FIG. 24, which particularly represents the illustration of FIG. 20. FIG. 25 illustrates a magnetic recording sheet S produced by the said transferable coating magnetic film T as illustrated in FIGS. 17, 18, 19 and 21. The said sheet comprises a magnetic coating 3 demarcated by parallel straight lines X and Y on a sheet of paper 1, having eyelets 38, 38, and becoming a complete magnetic recording sheet when the fitting holes are punched by the perforator shown in FIG. 13 at the parts indicated by 32, 32.

Figure 22:
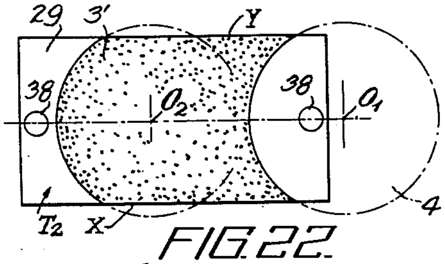
FIGURE 22 is a back view of the transferable coating magnetic film illustrating another example.

A magnetic recording sheet $S_2$ as in FIG. 23, comprising a magnetic coating 3' demarcated by parallel straight lines X and Y on a sheet of paper, the fitting holes 2, 2 and the eyelets 38, 38, may well be produced by a transferable coating magnetic film $T_2$ as illustrated in FIG. 22, which comprises a magnetic coating such as 3' on the carrier 29, confined within the effectual recording range, and the eyelets on the carrier 29 as 38, 38, in view of the fact that as shown in FIG. 22, the center of the turn-table 4 is positioned at $O_1$ in the initial start and at $O_2$ at the termination.

We claim:

A magnetic film structure adapted to be used for the manufacture of a magnetic sound record sheet which has visible indicia on one surface and which is to be placed for sound transducing in a predetermined position on a magnetic sound transducing apparatus by appropriate registration of holes provided in determinable positions in said sheet, said structure comprising a magnetic film, an adhesive layer provided on one surface of said magnetic film for bonding said magnetic film to the surface of the sheet opposite the surface having visible indicia, reinforcement pieces of substantially the same size as the registration holes, said reinforcement pieces being located with respect to said magnetic film at positions corresponding to said determinable positions, a carrier, and an adhesive on the other side of said film and inferior in adhesive strength to the adhesive on the first said side of the film, the second said adhesive bonding the film to the carrier so that the latter can be easily peeled off after the film is bonded to the sheet.

References Cited in the file of this patent

UNITED STATES PATENTS

| | | |
|---|---|---|
| 1,659,909 | De Forest | Feb. 21, 1928 |
| 2,479,868 | Rossmann et al. | Aug. 23, 1949 |
| 2,596,179 | Seymour | May 13, 1952 |
| 2,709,597 | Stroobants | May 31, 1955 |
| 2,788,879 | Rand | Apr. 16, 1957 |

FOREIGN PATENTS

| | | |
|---|---|---|
| 501,780 | Belgium | Mar. 31, 1951 |